(12) United States Patent
Ronlan

(10) Patent No.: US 9,671,305 B2
(45) Date of Patent: Jun. 6, 2017

(54) TYRE BALANCING COMPOSITIONS

(75) Inventor: Alvin Ronlan, Hillsboro Shore, FL (US)

(73) Assignee: Bertil Carnehamar, Zurich (CH)

( * ) Notice: Subject to any disclaimer, the term of this patent is extended or adjusted under 35 U.S.C. 154(b) by 709 days.

(21) Appl. No.: 12/756,679

(22) Filed: Apr. 8, 2010

(65) Prior Publication Data
US 2010/0252174 A1 Oct. 7, 2010

Related U.S. Application Data

(63) Continuation of application No. 11/080,952, filed on Mar. 14, 2005, now abandoned, which is a continuation of application No. 10/019,068, filed as application No. PCT/DK00/00331 on Jun. 21, 2000, now abandoned.

(30) Foreign Application Priority Data

Jun. 24, 1999 (EP) ..................................... 99112199

(51) Int. Cl.
| | |
|---|---|
| *B60C 19/00* | (2006.01) |
| *G01M 1/32* | (2006.01) |
| *F16F 15/36* | (2006.01) |
| *C10M 171/06* | (2006.01) |
| *B60C 5/00* | (2006.01) |

(52) U.S. Cl.
CPC .............. *G01M 1/326* (2013.01); *B60C 5/004* (2013.01); *B60C 19/003* (2013.01); *C10M 171/06* (2013.01); *F16F 15/363* (2013.01); *F16F 15/366* (2013.01)

(58) Field of Classification Search
CPC ........ B29D 30/0685; B29D 2030/0697; B60C 5/004; B60C 19/003; G01M 1/323; G01M 1/36; G01M 1/365; G01M 1/326; F16F 15/363; F16F 15/366; C10M 171/06
USPC ............. 156/75, 110.1, 115; 152/154.1, 504; 301/5.21, 5.22; 106/266
See application file for complete search history.

(56) References Cited

U.S. PATENT DOCUMENTS

| | | |
|---|---|---|
| 3,463,551 A | 8/1969 | Clay |
| 3,747,660 A | 7/1973 | Tibbals |
| 3,920,061 A * | 11/1975 | Japp ........................ B60C 17/10 |
| | | 152/504 |
| 3,987,833 A | 10/1976 | Powell et al. |
| 4,304,281 A | 12/1981 | Kenney |
| 4,867,792 A | 9/1989 | Ronlan |
| 4,981,608 A | 1/1991 | Gunther |
| 5,073,217 A | 12/1991 | Fogal |
| 5,083,596 A | 1/1992 | Kato et al. |
| 5,431,726 A | 7/1995 | Ronlan |
| 5,522,559 A | 6/1996 | Bredbeck |
| 5,540,767 A | 7/1996 | Ronlan |
| 6,128,952 A | 10/2000 | LeBlanc |
| 6,129,797 A | 10/2000 | Heffernan et al. |

FOREIGN PATENT DOCUMENTS

| | | |
|---|---|---|
| GB | 1209696 | 10/1970 |
| GB | 2074955 | 11/1981 |
| JP | 56-171302 | 12/1981 |

OTHER PUBLICATIONS

"American National Standard Voluntary Industrial Performance Standards for Pressure and Velocity of Shotshell Ammunition for the Use of Commercial Manufacturers", ANSI/SAAMI Z299.2-1992, pp. 31-32, 1996.*

* cited by examiner

*Primary Examiner* — Geoffrey L Knable
(74) *Attorney, Agent, or Firm* — Stolmer & Partner; Robert Lelkes

(57) ABSTRACT

The invention relates to tire balancing compositions having improved balancing properties comprise a visco-plastic gel and solid bodies having an average smallest dimension in the range of 0.5-5 mm; preferably 1-4 mm, more preferably around 3 mm. When applied in a layer to the inside of a motor vehicle tire, the compositions act by allowing the solid bodies move through the gel and to concentrate in areas to counteract imbalances. The solid bodies preferably have an average ratio $\alpha$ between their smallest and their largest dimension of $\alpha \leq 2$, more preferably $\alpha \leq 1.5$, especially around 1. The visco-plastic gel preferably has a storage modulus (G') between 1000 Pa and 25000 Pa at 22° C., a loss modulus (G") smaller than the storage modulus, and a critical yield stress above 3 Pa at 22° C. The bodies may be shaped as prolate or oblate ellipsoids, cylinders, rectangular paralleipipeds, or spheres, or mixtures of such bodies; they may have an apparent specific gravity in the range of 500-3000 kg/m$^3$, preferably 600-2000 kg/m$^3$, in particular 700-1000 kg/m$^3$, especially 800-900 kg/m$^3$; they may be made from polyolefins, polystyrene, polyvinyl chloride, polyamide, rubber or glass. The weight ratio between the solid bodies and the gel is from 10:1 to 1:10, preferably from 5:1 to 1:5, in particular from 2:1 to 3:1, such as from 1:1 to 1:2. The invention further concerns a tire balancing kit and a method for balancing automobile wheel assemblies.

31 Claims, No Drawings

TYRE BALANCING COMPOSITIONS

RELATED APPLICATIONS

This application is a continuation of U.S. patent application Ser. No. 11/080,952, filed Mar. 14, 2005, which is a continuation of U.S. patent application Ser. No. 10/019,068, filed Apr. 26, 2002 which is a national stage application of International Application No. PCT/DK00/00331, filed Jun. 21, 2000 which claims priority to European Application No. 99112199.7, filed Jun. 24, 1999.

FIELD OF THE INVENTION

The present invention relates to tyre balancing compositions for use in eliminating/reducing vibrations in motor vehicle wheel assemblies related to tyre and rim imperfections, as well as to the use of such compositions.

BACKGROUND OF THE INVENTION

Vibrations in rolling wheel assemblies (tyre+rim) are caused by several, different types of tyre imperfections, the most important being:

Non-homogeneous mass distribution
Stiffness variations
Geometric variations
Radial and lateral run outs
Eccentricity Similarly, imperfections in the rim will also induce vibrations.

The at present most common method for elimination of wheel assembly derived vibrations is still the attachment of lead weights to the tyre rim. However, quite apart from giving rise to a diffuse lead pollution in the environment through the weights falling off, this method can only compensate (and even at best only partially) for vibrations caused by non-homogeneous mass distribution in the wheel assembly, and since the other imperfections mentioned above are just as important sources of vibrations, lead weight balancing is not a satisfactory method for balancing of modern quality tyres.

European Patent No. 0557365 describes a different approach to reduction of vibrations induced by wheel assembly imperfections, comprising introduction of a visco-plastic gel into the tyre cavity. The principle behind the action of such gels is that they are able to flow under the stresses induced by vibrations and therefore spontaneously distribute themselves in a rolling tyre in such a way that the vibrations are reduced irrespective of what type of imperfections they are induced by. The efficiency of these balancing gels as compared to lead weight balancing can be demonstrated experimentally by measuring vertical accelerations on the spring leg of a front axle with its wheels running under load against a rotating drum. Typical results have shown that lead weight balancing actually increases vertical accelerations which clearly demonstrates that other sources of vibrations than non-homogeneous mass distribution are more important in this case. However, such balancing gels cannot completely eliminate vibrations caused by wheel assembly imperfections, because the centrifugal stress induced in a balancing gel by localised thickening (which occurs to diminish vibrations) will eventually be as strong as the residual vibrational forces caused by the imperfections, and therefore an equilibrium is established where a certain level of vertical accelerations will remain.

Also, a drawback with gel compositions in general is that a fairly large amount of gel must employed per tyre since a gel is not able to form localized "lumps" in the manner of a lead weight but must instead form a film layer with a continuously and gradually changing depth in order to provide the required balancing.

SUMMARY OF THE INVENTION

The object of the present invention is to eliminate or substantially reduce the above mentioned remaining level of vertical accelerations as well as provide a significant reduction of the amount of composition needed per tyre. It has now been found that by incorporating or imbedding into the gel layer a certain amount of solid masses or bodies of a certain size, said size being at least sufficiently large to enable the bodies to move through the gel layer under the influence of acceleration forces induced by imbalances, but not so large as to themselves begin to induce vibrations, greatly enhances and expands the ability of the composition to reduce vibration and to balance wheel assemblies.

The invention therefore concerns a tyre balancing composition which comprises on the one hand a visco-plastic gel and on the other hand solid bodies having an average smallest dimension in the range of 0.5-5 mm.

In the present context, the term "solid" as applied to the bodies is intended to mean particles having a continuous and fairly smooth surface, but not necessarily having no voids or cavities. Thus, a solid body within the meaning of the present invention may be hollow or have internal porosities, although a truly solid body, i.e. one having a continuous material phase all through and no cavities or porosities, is preferred.

The invention also relates to a tyre balancing composition kit, a balancing composition according to the invention contained in a wheel assembly, as well as a method for balancing motor vehicle wheel assemblies.

The gels in which the solid bodies are present or imbedded to form the compositions of the invention will in the following be known as DFC (Dynamic Force Compensation) gels.

DETAILED DESCRIPTION OF THE INVENTION

The solid bodies imbedded in the gels to act as moving masses may be any type of solid bodies of the specified dimensions which are able to be dispersed discretely in a visco-plastic gel. In a preferred embodiment, the bodies have an average ratio $\alpha$ between their smallest and their largest dimension of $\alpha \leq 2$ since particles with larger such aspect ratios tend only to move with ease in the longitudinal direction, $\alpha$ preferably being $\leq 1.5$, in particular around 1.

Due to the increasing importance with decreasing particle size of molecular interactions (hydrogen bonding, van der Wals forces, electrostatic interactions, etc.) between the solid masses and the visco-plastic gel in relation to the vibrational and centrifugal forces acting on the masses, masses with a average diameter below 0.1 mm do not seem to contribute to the balancing efficiency of the gel-particle composition. Consequently, the smallest dimension of the bodies is, as stated above, in the range 0.5-5 mm. In a preferred embodiment, the average smallest dimension of the bodies is in the range of 1-4 mm, in particular around 3 mm.

Suitable visco-plastic gels that will enable imbedded masses move in order to compensate vibrational forces to a smaller or larger degree can be defined in rheological (as measured with a Stress Tech Rheometer from Rheologica AB, Lund, Sweden) by the following characteristics:

Storage Modulus3 (G'): Between 1000 Pa and 25000 Pa at 22° C.
Loss Modulus3 (G"): Smaller than the Storage Modulus
Critical Yield Stress: Exceeding 3 Pa at 22° C.

In a preferred embodiment, the Storage Modulus is around 9000 Pa at 22° C. The Critical Yield Stress is preferably around 30 Pa at 22° C.

In order to interact in a suitable manner with the tyre and the imbedded solid bodies, the composition of the invention should preferably also exhibit suitable adhesive properties ("stickiness") with respect to the tyre and the bodies. Thus, the adhesion between tyre inner lining and the visco-plastic gels as well as the adhesion between imbedded masses and the visco-plastic gels may be evaluated in the following two step practical test:

Step 1:

A two mm thick, 100×100 mm square of the visco-plastic gel to be tested is applied to the middle of a sheet (200×200 mm) of chloro-butyl rubber glued onto a stiff support (metal plate) as well as to the middle of a similar sheet of butyl rubber. The two sheets are raised into a vertical position and left standing for 24 hours at 22° C. and 65% R. H. If the displacement of the upper rim of the gel-square is less than 3 mm on both test surfaces, the adhesion of the gel component to tyre inner linings is deemed satisfactory.

Step 2:

A two mm thick, 100×100 mm square of a visco-plastic gel that conforms to the requirements of Step 1 of this test is applied to the middle of a sheet (200×200 mm) of chloro-butyl rubber glued onto a stiff support (metal plate), and 10 HD polyethylene disk-shaped pellets (specific weight 0.9, disk average diameter: 4.5 mm, disk average height 3 mm) are inserted randomly into the gel. The sheet is raised into a vertical position and left standing for 24 hours at 22° C. and 65% R. H. If the average displacement of the pellets is less than 2 mm, the adhesion of the gel component to solid masses is deemed satisfactory.

Visco-plastic gels that conform to both step both Step 1 and Step 2 of this test are considered suitable with respect to adhesive properties.

Apart from the rheological and adhesive criteria defined above, visco plastic gels suitable for use in this invention should preferably also satisfy certain other physical and chemical criteria that will ensure optimum function under the operating conditions and environment of this particular application, such as:

compatibility with tyre inner liners,
proper response and displacement under the action of combined centrifugal and vibrational shear stresses,
constancy of response over a broad temperature range,
stability of material properties and response over many years in use,
chemical inertia of the gel components vis a vis tyre inner liner rubber,
stability of the gel composition and properties under high g-stress and shear stresses,
little change in material properties and behaviour upon ageing in normal operating conditions.

The visco-plastic gels, in which the solid bodies are imbedded to form the balancing compositions of the invention, may be of any chemical composition which provides the visco-plastic properties required, preferably as defined above as well as with the other physical and chemical properties enumerated above. Such visco-plastic gels will typically be composed from on the one hand one or more organic base oils having a suitably low viscosity index and on the other hand a gel former. Non-limiting examples of base oils are mineral oil, polyol esters of fatty acids derived from synthetic or naturally occurring polyols and fatty acids, synthetic hydrocarbon oils such as polypropylene oils, poly-alpha-olefins, polybutenes, polyglycols such as liquid polyethylene glycol or liquid polypropylene glycol, or ethylene oxide/propylene oxide copolymers, as well as mixtures thereof. Non-limiting examples of gel formers are colloidal silicas, polyacrylic acids, bentonite clay and metal soaps.

One suitable type of gels are those described in the above mentioned European Patent 0557365 (or its U.S. counterpart U.S. Pat. No. 5,431,726 which is hereby incorporated by reference).

The solid bodies may suitably be shaped as prolate or oblate ellipsoids, cylinders, rectangular paralleipipeds, or spheres, or mixtures of such bodies. They may be prepared through any method known in the art such as emulsion polymerisation of polymers or cutting rectangular or circular cross-section extrudates into suitable lengths.

In order that the solid bodies do not interact unduly with the inside of the tyre when under the influence of centrifugal forces, it is preferred that the apparent specific gravity of the solid bodies is in the range of 500-3000 $kg/m^3$, more preferably 600-2000 $kg/m^3$, in particular 700-1000 $kg/m^3$, especially 800-900 $kg/m^3$. The term "apparent specific gravity" as applied to the solid bodies refers to the ratio between the weight of each individual solid body and the volume enclosed by the outer, continuous surface, Thus, it will be clear that if the bodies are hollow or otherwise include voids or are porous, the apparent specific gravity may lower than the nominal specific gravity of the material from which the bodies are made.

The solid bodies should preferably be made from a material which does not interact unsuitably with the visco-plastic gel. Non-limiting examples of suitable materials for the solid bodies are various polymers such as polyolefins, e.g. polyethylene (either high or low density) or polypropylene; polystyrene; polyvinyl chloride; polyamides, e.g nylons; rubbers such as butyl rubber or latex; or glass.

The content of solid bodies in the composition of the invention may vary within fairly wide limits since the purpose of the bodies is to move in the gel layer to establish zones with a high concentration of solid bodies to act as balancing elements. The weight ratio between the solid bodies and the gel is preferably from 10:1 to 1:10, more preferably from 5:1 to 1:5, in particular from 2:1 to 1:3, such as from 1:1 to 1:2.

It will be evident that in order to work the invention, imbedding the solid bodies in the visco-plastic gel to form the composition of the invention need not take place outside the tyre. Thus, when applying the teaching of the present invention, it will also possible to instead first distribute a suitable amount of a visco-plastic gel on the inside of a tyre and subsequently distribute a suitable amount of solid bodies on the gel layer, thereby forming a composition of the invention.

Consequently, the invention further concerns a tyre balancing composition kit comprising
 i) a first container containing a visco-plastic gel, and
 ii) a second container containing solid bodies having their average smallest dimension in the range of 0.5-5 mm.

The visco-plastic gel and the solid bodies, respectively, preferably are defined as and/or exhibit the properties and attributes listed above.

In a preferred embodiment of the balancing kit of the invention, the weight ratio between the amount of visco-plastic gel in the first container and the amount of solid bodies in the second container is from 10:1 to 1:10, preferably from 5:1 to 1:5, in particular from 2:1 to 3:1, such as from 1:1 to 1:2.

In a particularly preferred embodiment, and in order to eliminate or reduce any errors in applying them in the correct amounts, the amounts of the visco-plastic gel and the solid bodies in the first and second containers, respectively, of the balancing kit according to the invention are adapted to be applied to one single automobile tyre, whether a passenger automobile tyre, a truck tyre or the like. Such amounts will typically be from 50 to 400 g per tyre for passenger vehicle tyres, and 300-1000 g per tyre for truck tyres.

Due to the above described possibility of not combining the visco-plastic gel and solid bodies until in the tyre, the present invention likewise further relates to a tyre balancing composition according to the invention as defined above contained within the air cavity of a motor vehicle tyre.

Finally, the invention also relates to a method for balancing a motor vehicle wheel assembly, said method comprising the steps of
applying to the inner surface of the tyre
 i) a tyre balancing composition as defined above, or
 ii) the components of a tyre balancing kit as defined above;
mounting the tyre on a tyre rim to form a wheel assembly; and
 mounting the wheel assembly on a motor vehicle and driving the vehicle for a distance sufficient to allow the balancing composition to balance the wheel assembly, or
 mounting the wheel assembly in a device that allows the wheel assembly to be rotated under load conditions similar to those experienced during actual road driving and at a speed where resonance occurs in the wheel assembly, and rotating the wheel for a time sufficient to allow the balancing composition to reduce vibrations to a stable minimum.

The amount of visco-plastic gel applied to the inside of the tyre should preferably be in the range of 0.01-1 grams per $cm^2$, more preferably 0.02-0.5 grams, in particular 0.02-0.1 grams per $cm^2$, of the inner lining surface of the tyre adjacent the part of the tyre that actually contacts the road (the tyre tread). The amount of solid masses in the tyre balancing kit of the invention applied to the inside of the tyre should preferably be between 10 and 200 g for car tyres and between 50 and 500 g for truck tyres, more preferably between 10 and 100 g for car tyres and between 50 and 300 g for truck tyres, in particular 20-80 g and 80-150 g, respectively.

The invention is further illustrated by the following non-limiting examples.

Example 1

A DFC-gel (250 g) consisting of 1 weight part of HD polyethylene disks (specific weight 0.9, disk average diameter: 4.5 mm, disk average height 3 mm), and 2 weight parts of a visco-plastic gel according to European patent no. 0557365 and consisting of an ethylene oxide (EO)/propylene oxide (PO) copolymer (UCON 50-HB-5100 from Union Carbide, theoretical molecular weight equal to 4000) and fumed silica (Aerosil 202 from Degussa), was introduced into the cavity of a Michelin 175/65/R14 tyre. The tyre was mounted on a car and driven until all vibrations disappeared. The wheel assembly was dismounted from the car, and measurement in a spin-balancing machine showed only insignificant residual weight imbalance. Inspection of the inner tyre wall showed an uneven distribution of the polyethylene pellets as would be expected if balancing is to take place.

Example 2

100 g of a visco-plastic gel according to European patent no. 0557365 and consisting of an ethylene oxide/propylene oxide copolymer (L1 from Lyondell Chemical Worldwide, Inc., EO to PO ratio equal to 1:1 and theoretical molecular weight (Mw) equal to 6500) (74.0%), castor oil No. 1 (18.5%) and fumed silica (Aerosil A300 from Degussa) (7.5%) was introduced into the cavity of a Michelin 175/65/R14 tyre and spread around the inner perimeter. HD polyethylene disks (specific weight 0.9, disk average diameter: 4.5 mm, disk average height 3 mm) were then sprinkled evenly on top of the gel layer. The tyre was mounted on a car and driven until all vibrations disappeared. The wheel assembly was dismounted from the car, and measurement in a spin-balancing machine showed only insignificant residual weight imbalance. Inspection of the inner tyre wall showed a distribution of the polyethylene pellets as would be expected if balancing is to take place.

Example 3

250 g of a visco-plastic gel according to European patent no. 0557365 and consisting of 93% of a 4:1 mixture of two ethylene oxide/propylene oxide copolymers (L1 from Lyondell Chemical Worldwide, Inc., EO to PO ratio equal to 1:1 and theoretical molecular weight (Mw) equal to 6500 (4 parts), and L1-Diol from Lyondell Chemical Worldwide, Inc., EO to PO ratio equal to 1:1 and theoretical molecular weight (Mw) equal to 13000) (1 part)) and 7% of fumed silica (Cab-O-Sil TS720 from Cabot Corporation) was introduced into the cavity of a Michelin XH4 235/75/15 tyre and spread around the inner perimeter. LD polyethylene spheres (specific weight 0.85, sphere average diameter: 4 mm) were then sprinkled evenly on top the gel layer. The tyre was mounted on a sports utility vehicle and driven until all vibrations disappeared. The wheel assembly was dismounted from the vehicle, and measurement in a spin-balancing machine showed only insignificant residual weight imbalance. Inspection of the inner tyre wall showed a distribution of the polyethylene spheres as would be expected if balancing is to take place.

I claim:
1. A composition for balancing tires that comprises a visco-plastic gel and solid bodies made from a material selected from the group consisting of polyolefins, polystyrene, polyvinyl chloride, polyamide, and glass having an apparent specific gravity in the range of 700-1000 $kg/m^3$, an average smallest dimension of 3 mm and an average ratio between their smallest and largest dimension of $\alpha \leq 2$, wherein the visco-plastic gel has a storage modulus (G') between 1000 Pa and 25000 Pa at 22° C., a loss modulus (G") smaller than the storage modulus, and a critical yield stress above 3 Pa at 22° C. and the visco-elastic gel comprises:
 (a) 80 to 95% by weight of a substance or mixture of substances that are selected from the group consisting of

(i) polybutene oil having a maximum specific gravity of 900 kg/m³ and a pour point (ASTM D97) of less than +2° C.,
(ii) paraffinic or naphthenic oils having a maximum specific gravity of 900 kg/m³ and a pour point (ASTM D97) of less than +2° C.,
(iii) polypropylene glycol alkyl ethers having a pour point (ASTM D97) of less than +2° C.,
(iv) polypropylene oils having a pour point (ASTM D97) of less than +2° C.,
(v) liquid polyethylene glycol,
(vi) liquid polypropylene glycol, and
(vii) ethylene oxide/propylene oxide copolymers; and
(b) 4 to 15% by weight of fumed silica having a BET surface in the range of 50 to 400 m²/g.

2. The composition according to claim 1, wherein $\alpha \leq 1.5$.

3. The composition according to claim 1, wherein $\alpha$ is 1.

4. The composition according to claim 1, wherein the storage modulus (G') is 9000 Pa at 22° C., and the critical yield stress is up to 30 Pa at 22° C.

5. The composition according to claim 1, wherein the solid bodies are shaped as prolate or oblate ellipsoids, cylinders, rectangular parallelepipeds, spheres, or mixtures of such bodies.

6. The composition according to claim 1, wherein the visco-plastic gel comprises liquid polyethylene glycol, liquid polypropylene glycol or ethylene oxide/propylene oxide copolymer.

7. The composition according to claim 6, wherein the visco-plastic gel comprises ethylene oxide/propylene oxide copolymer.

8. The composition according to claim 7, wherein the storage modulus (G') is between 3000 Pa and 15000 Pa at 22° C. and the critical yield stress exceeds 15 Pa at 22° C.

9. The composition according to claim 8, wherein the apparent specific gravity of the solid bodies is in the range of 800-900 kg/m³.

10. The composition according to claim 1, wherein the solid bodies are made from a material selected from the group consisting of polyolefins.

11. The composition according to claim 1, wherein the weight ratio between the solid bodies and the gel is from 10:1 to 1:10.

12. The composition according to claim 11, wherein the weight ratio between the solid bodies and the gel is from 5:1 to 1:5.

13. The composition according to claim 12, wherein the weight ratio between the solid bodies and the gel is from 2:1 to 1:3.

14. The composition according to claim 13, wherein the weight ratio between the solid bodies and the gel is from 1:1 to 1:2.

15. The composition according to claim 1 contained within the air cavity of a motor vehicle tire.

16. A method for balancing a motor vehicle wheel assembly comprising applying a tire balancing composition according to claim 1 to the inner surface of a tire, mounting the tire on a tire rim to form a wheel assembly, and mounting the wheel assembly on a motor vehicle and driving the vehicle for a distance sufficient to allow the balancing composition to balance the wheel assembly, or mounting the wheel assembly in a device that allows the wheel assembly to be rotated under load conditions similar to those experienced during actual road driving and at a speed where resonance occurs in the wheel assembly, and rotating the wheel for a time sufficient to allow the balancing composition to reduce vibrations to a stable minimum.

17. A kit for balancing tires comprising
I) a first container containing a visco-plastic gel, wherein the visco-plastic gel has a storage modulus (G') between 1000 Pa and 25000 Pa at 22° C., a loss modulus (G") smaller than the storage modulus, and a critical yield stress above 3 Pa at 22° C., and the viscoelastic gel comprises
a) 80 to 95% by weight of a substance or mixture of substances that are selected from the group consisting of
i) polybutene oil having a maximum specific gravity of 900 kg/m³ and a pour point (ASTM D97) of less than +2° C.,
ii) paraffinic or naphthenic oils having a maximum specific gravity of 900 kg/m³ and a pour point (ASTM D97) of less than +2° C.,
iii) polypropylene glycol alkyl ethers having a pour point (ASTM D97) of less than +2° C.,
iv) polypropylene oils having a pour point (ASTM D97) of less than +2° C.,
v) liquid polyethylene glycol,
vi) liquid polypropylene glycol, and
vii) ethylene oxide/propylene oxide copolymers; and
b) 4 to 15% by weight of fumed silica having a BET surface in the range of 50 to 400 m²/g, and
II) a second container containing solid bodies made from a material selected from the group consisting of polyolefins, polystyrene, polyvinyl chloride, polyamide, and glass having an apparent specific gravity in the range of 700-1000 kg/m³, an average smallest dimension of 3 mm and an average ratio between their smallest and their largest dimension of $\alpha \leq 2$.

18. The kit according to claim 17, wherein the visco-plastic gel has a storage modulus (G') 9000 Pa at 22° C. and a critical yield stress up to 30 Pa at 22° C.

19. The kit according to claim 17, wherein $\alpha \leq 1.5$.

20. The kit according to claim 17, wherein $\alpha$ is 1.

21. The kit according to claim 17, wherein the solid bodies are shaped as prolate or oblate ellipsoids, cylinders, rectangular parallelpipeds, or spheres, or mixtures of such bodies.

22. The kit according to claim 17, wherein the visco-plastic gel comprises liquid polyethylene glycol, liquid polypropylene glycol or ethylene oxide/propylene oxide copolymer.

23. The kit according to claim 22, wherein the visco-plastic gel comprises ethylene oxide/propylene oxide copolymer.

24. The kit according to claim 23, wherein the visco-plastic gel has a storage modulus (G') between 3000 Pa and 15000 Pa at 22° C. and the critical yield stress exceeds 15 Pa at 22° C.

25. The kit according to claim 24, wherein the apparent specific gravity of the solid bodies is in the range of 800-900 kg/m³.

26. The kit according to claim 17, wherein the solid bodies are made from a material selected from the group consisting of polyolefins.

27. The kit according to claim 17, wherein the weight ratio between the amount of visco-plastic gel in the first container and the amount of solid bodies in the second container is from 10:1 to 1:10.

28. The kit according to claim 27, wherein the weight ratio between the amount of visco-plastic gel in the first container and the amount of solid bodies in the second container is from 5:1 to 1:5.

29. The kit according to claim 28, wherein the weight ratio between the amount of visco-plastic gel in the first container and the amount of solid bodies in the second container is from 2:1 to 1:3.

30. The kit according to claim 29, wherein the weight ratio between the amount of visco-plastic gel in the first container and the amount of solid bodies in the second container is from 1:1 to 1:2.

31. A method for balancing a motor vehicle wheel assembly comprising applying the components of a kit according to claim 17 to the inner surface of a tire, mounting the tire on a tire rim to form a wheel assembly, and mounting the wheel assembly on a motor vehicle and driving the vehicle for a distance sufficient to allow the balancing composition to balance the wheel assembly, or mounting the wheel assembly in a device that allows the wheel assembly to be rotated under load conditions similar to those experienced during actual road driving and at a speed where resonance occurs in the wheel assembly, and rotating the wheel for a time sufficient to allow the balancing composition to reduce vibrations to a stable minimum.

* * * * *